US006898193B2

(12) United States Patent
Saifuddin

(10) Patent No.: US 6,898,193 B2
(45) Date of Patent: May 24, 2005

(54) ADAPTIVE GAIN ADJUSTMENT CONTROL

(75) Inventor: Ahmed Saifuddin, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 71 days.

(21) Appl. No.: 10/177,132

(22) Filed: Jun. 20, 2002

(65) Prior Publication Data

US 2003/0235160 A1 Dec. 25, 2003

(51) Int. Cl.⁷ .......................... H04L 12/26; H04J 1/16; G08C 15/00; G06F 11/00; G01R 31/08
(52) U.S. Cl. ........................ 370/326; 370/252; 370/333; 370/335; 455/69; 455/522
(58) Field of Search ................................. 370/310, 318, 370/320, 326, 328, 335, 342, 343, 465, 468, 252, 329; 455/69, 70, 115, 127, 422, 442, 522, 524, 574, 575; 375/316, 200; H04B 1/00, 1/02, 7/00, 7/26, 7/005, 7/216; H04J 3/08, 3/22; H04Q 7/00, 7/30

(56) References Cited

U.S. PATENT DOCUMENTS

| | | | | |
|---|---|---|---|---|
| 5,056,109 A | * | 10/1991 | Gilhousen et al. | 370/342 |
| 5,933,781 A | * | 8/1999 | Willenegger et al. | 455/522 |
| 5,995,496 A | * | 11/1999 | Honkasalo et al. | 370/318 |
| 6,167,273 A | * | 12/2000 | Mandyam | 455/450 |
| 6,298,242 B1 | * | 10/2001 | Schiff | 455/522 |
| 6,366,195 B1 | * | 4/2002 | Harel et al. | 340/7.21 |
| 6,496,706 B1 | * | 12/2002 | Jou et al. | 455/522 |
| 6,512,925 B1 | * | 1/2003 | Chen et al. | 455/442 |
| 6,603,752 B1 | * | 8/2003 | Saifuddin et al. | 370/335 |
| 2001/0053128 A1 | * | 12/2001 | Lee | 370/244 |
| 2002/0027897 A1 | * | 3/2002 | Moulsley et al. | 370/342 |
| 2002/0028691 A1 | * | 3/2002 | Moulsley et al. | 455/522 |
| 2002/0067774 A1 | * | 6/2002 | Razoumov et al. | 375/316 |
| 2003/0039267 A1 | * | 2/2003 | Koo et al. | 370/465 |
| 2003/0045319 A1 | * | 3/2003 | Sarkar et al. | 455/522 |
| 2003/0050084 A1 | * | 3/2003 | Damnjanovic et al. | 455/522 |
| 2003/0054825 A1 | * | 3/2003 | Chen et al. | 455/442 |
| 2003/0064743 A1 | * | 4/2003 | Chen | 455/522 |
| 2003/0148769 A1 | * | 8/2003 | Chi et al. | 455/453 |
| 2003/0157953 A1 | * | 8/2003 | Das et al. | 455/522 |
| 2003/0189906 A1 | * | 10/2003 | Belcea | 370/318 |

FOREIGN PATENT DOCUMENTS

| | | | | |
|---|---|---|---|---|
| EP | 1207644 A2 | * | 5/2002 | H04L/1/00 |

OTHER PUBLICATIONS

ISR, PCT/US 03/19459, Oct. 31, 2003.*
Microsoft Computer Dictionary, p. 58, 5th ed., Microsoft Press, 2002.*

\* cited by examiner

Primary Examiner—Man U. Phan
(74) Attorney, Agent, or Firm—Philip R. Wadsworth; Thien T. Nguyen

(57) ABSTRACT

Systems and techniques are disclosed relating to telecommunications which include transmitting a plurality of data groups to a receiver at a first power level, retransmitting a first one of the data groups to the receiver at a second power level lower than the first power level, providing feedback from the receiver relating to the retransmission of the first one of the data groups, and retransmitting a second one of the data groups to the receiver at a third power level different from the second power level, the third power level being a function of the feedback. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

28 Claims, 4 Drawing Sheets

ADAPTIVE GAIN ADJUSTMENT CONTROL

BACKGROUND

1. Field

The present invention relates generally to communications systems, and more specifically, to systems and techniques for adaptively controlling the gain of one or more channels in a communications system.

2. Background

Modern communications systems are designed for multiple user access to a common communications medium. Numerous multiple-access techniques are known in the art, such as time division multiple-access (TDMA), frequency division multiple-access (FDMA), space division multiple-access, polarization division multiple-access, code division multiple-access (CDMA), and other similar multi-access techniques. The multiple-access concept is a channel allocation methodology which allows each user to access a common communications medium without interfering with others.

In multi-access communications systems, techniques to reduce mutual interference between multiple users are often utilized to increase user capacity. By way of example, power control techniques are currently employed to limit the transmission power of each user to that necessary to achieve a desired quality of service. This approach ensures that each user transmits only the minimum power necessary, but no higher, thereby making the smallest contribution to the total noise seen by others. However, as user demands for multi-access capability increases, techniques to further reduce the transmission power of each user without compromising the quality of service are needed.

SUMMARY

In one aspect of the present invention, a method of communications includes transmitting a plurality of data groups to a receiver at a first power level, retransmitting a first one of the data groups to the receiver at a second power level lower than the first power level, providing feedback from the receiver relating to the retransmission of the first one of the data groups, and retransmitting a second one of the data groups to the receiver at a third power level different from the second power level, the third power level being a function of the feedback.

In another aspect of the present invention, computer-readable media embodying a program of instructions executable by a computer program performs a method of communications, the method includes setting a plurality of data groups to a first power level for transmission to a receiver, setting a first one of the data groups to a second power level lower than the first power level for retransmission to the receiver, receiving feedback from the receiver relating to a retransmission of the first one of the data groups, and setting a second one of the data groups to a third power level for retransmission to the receiver, the third power level being a function of the feedback.

In yet another aspect of the present invention, an apparatus includes a transmitter, a buffer configured to provide a plurality of data groups to the transmitter for initial transmission to a receiver, and provide at least first and second ones of the data groups to the transmitter for retransmission to the receiver, and a gain control configured to set each of the data groups to a first power level for initial transmission, set the first one of the data groups to a second power level lower than the first power level, receive feedback from the receiver relating to the first one of the data groups, and set the second one of the data groups to a third power level as a function of the feedback.

In a further aspect of the present invention, an apparatus includes a transmitter, a buffer configured to provide a plurality of data groups to the transmitter, and identify each of the data groups provided to the transmitter as an initial transmission or retransmission to a receiver, and a gain control configured to set each of the data groups identified as an initial transmission to an initial power level, receive feedback from the receiver related to each of the data groups identified as a retransmission, and adjust the power level for each of the data groups identified as a retransmission based on the feedback from the respective previous retransmission.

In yet a further aspect of the present invention, an apparatus includes a transmitter, means for providing a plurality of data groups to the transmitter for initial transmission to a receiver, means for providing at least first and second ones of the data groups to the transmitter for retransmission to the receiver, means for setting each of the data groups to a first power level for initial transmission, means for setting the first one of the data groups to a second power level lower than the first power level, means for receiving feedback from the receiver relating to the first one of the data groups, and means for setting the second one of the data groups to a third power level as a function of the feedback.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In an exemplary communications system, power control techniques can be used to limit the power of each user to that necessary to achieve a desired quality of service. If the communications system supports packet data services with retransmission capability for corrupted data, the retransmission power can be further limited by using the information received from the corrupted data to decode the retransmitted data. More specifically, the soft decisions from the corrupted data can be soft combined with the retransmitted data to reduce the energy per bit ($E_b N_t$) required to maintain the desired quality of service. As a result, user capacity of the system may be increased.

Figure 1:
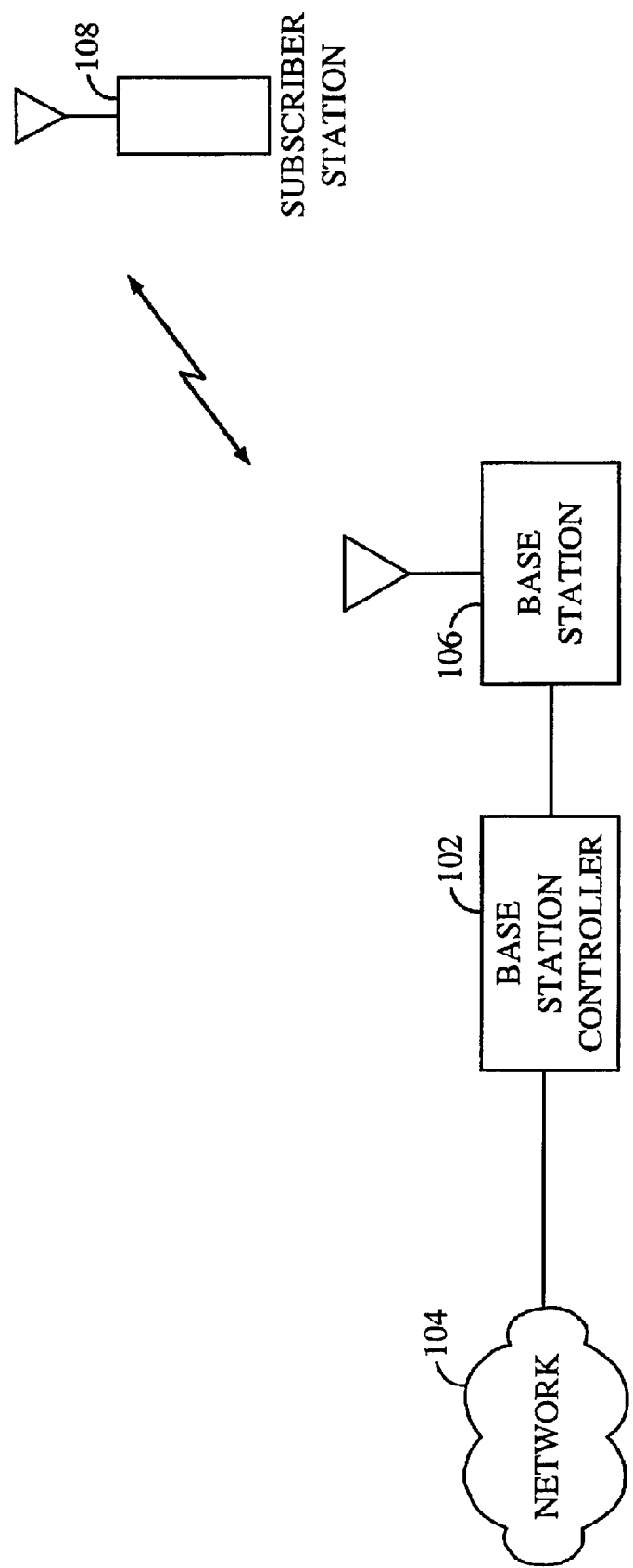
FIG. 1 is a conceptual overview of an exemplary CDMA communications system.

The application of these power control techniques can be illustrated with reference to an exemplary CDMA communications system as shown in FIG. 1. CDMA is a modulation and multiple access technique based on spread-spectrum communications. In a CDMA communications system, a large number of signals share the same frequency spectrum. This is achieved by transmitting each signal with a different code that modulates a carrier, and thereby, spreads the spectrum of the signal waveform. The transmitted signals are separated in the receiver by a demodulator that uses a corresponding code to despread the desired signal's spectrum. The undesired signals, whose codes do not match, are not despread in bandwidth and contribute only to noise.

Although various aspects of these power control techniques will be described in the context of a CDMA communications system, those skilled in the art will appreciate that these techniques are equally applicable to various other communications environments. Accordingly, any reference to a CDMA communications system is intended only to illustrate the inventive aspects of the present invention, with the understanding that such inventive aspects have a wide range of applications.

Turning to FIG. 1, a base station controller 102 can be used to provide an interface between a network 104 and all base stations dispersed throughout a geographic area. The geographic area is divided into coverage regions known as cells or sectors. A base station is generally assigned to serve all subscriber stations in a coverage region. For ease of explanation, only one base station 106 is shown. A subscriber station 108 may access the network 104, or communicate with other subscriber stations (not shown), through one or more base stations under control of the base station controller 102.

The exemplary CDMA communications system supports two-way communications between the base station 106 and the subscriber station 108. Transmissions from the base station 106 to the subscriber station 108 are referred to as forward link transmissions, and transmissions from the subscriber 108 to the base station 106 are referred to as reverse link transmissions. The base station 106 typically controls the reverse link power of a reference or pilot signal transmitted from the subscriber station 108 using various power control techniques well known in the art. The subscriber station 108 also transmits traffic over the reverse link. The reverse link power of the traffic can be set by the subscriber station 108 based on the power of the pilot signal using a traffic-pilot ratio. The traffic-pilot ratio may be set based on any number of parameters such as the carrier frequency, chip rate, data rate, modulation scheme, frame length, or any other parameters. In at least one embodiment of the CDMA communications system, the base station 106 can be configured to provide feedback to the subscriber station 108 indicating whether the reverse link traffic can be successfully decoded. This can be accomplished by transmitting the reverse link traffic in data groups, typically known as frames, and sending an acknowledgement (ACK) response over the forward link for each frame that can be successfully decoded by the base station 106. For those frames that cannot be successfully decoded, a negative acknowledgement (NACK) response can be sent to the subscriber station 108 over the forward link requesting a retransmission of that frame. Because the base station 106 can use the information from the unsuccessfully decoded frame, the subscriber station 108 can reduce the transmission power of the frame being retransmitted by reducing the traffic-pilot ratio. In a manner to be described in greater detail later, the level of power reduction for retransmitted frames can be adaptively adjusted to optimize performance.

Figure 2:
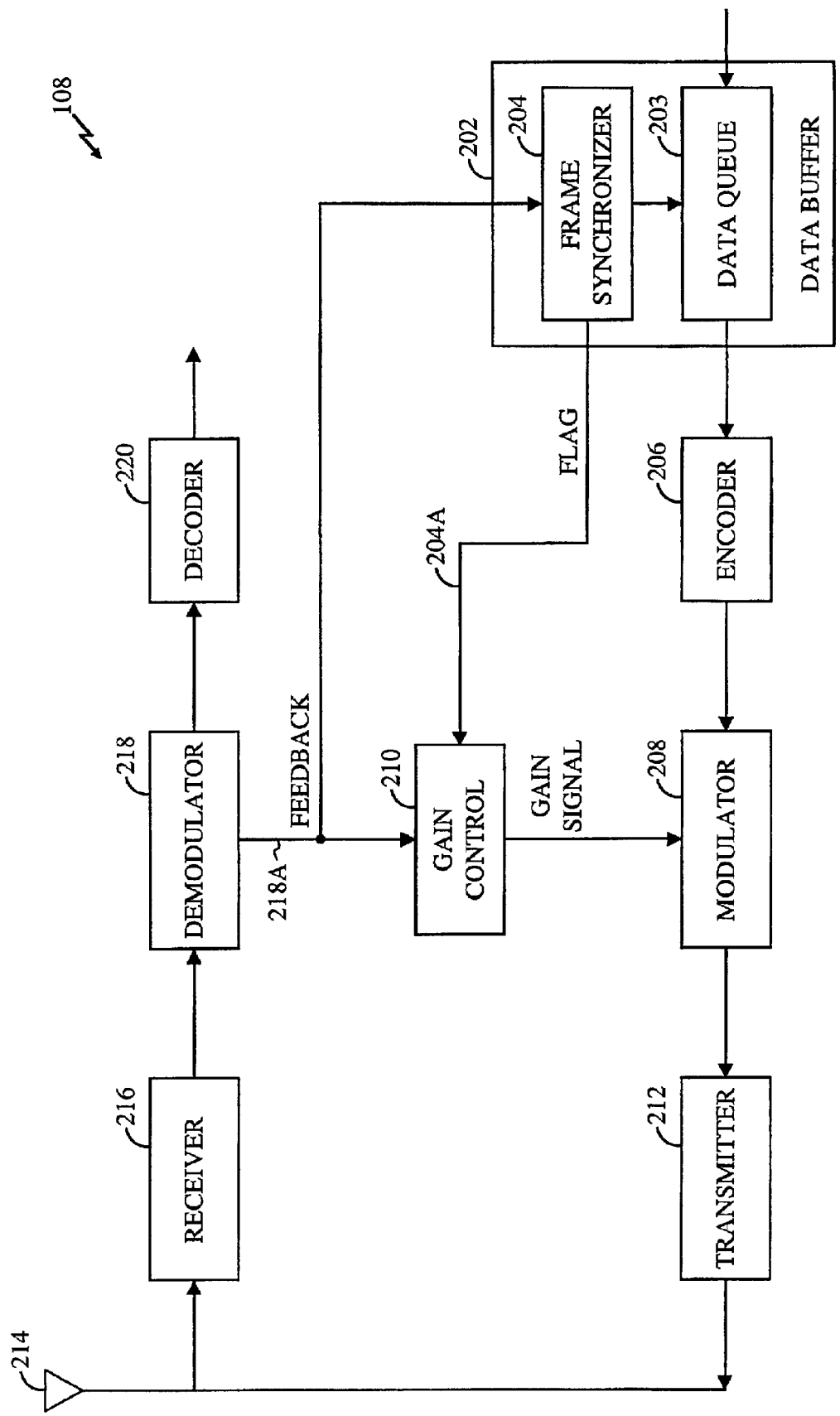
FIG. 2 is a simplified functional block diagram of a subscriber station configured to operate in a CDMA communications system.

FIG. 2 is a functional block diagram of an exemplary subscriber station. The subscriber station 108 includes a data buffer 202 which partitions the reverse link traffic into data groups for transmission to the base station. The data groups can be data frames, or any other type of data groups such as a data packets. The data buffer 202 includes a data queue 203 and a frame synchronizer 204. The data queue 203 can be used to buffer data from an external data source (not shown), and the frame synchronizer 204 can be used to control, the release of data frames sequentially from the data queue 203 to an encoder 206. The encoder 206 provides error correction coding and interleaving of the data within each frame. The encoded frames can be provided to the modulator 208 where they are spread with a Walsh cover and amplified with a gain signal computed by a gain control 210. The Walsh covered frames can then be combined with other overhead signals, each having a unique Walsh code, spread with a long pseudo-random noise (PN) code generated by a unique user address mask, and quadrature modulated with short PN codes identifying the base station. The quadrature modulated signal can then be provided to a transmitter 212 where it is upconverted, filtered and amplified for over the air transmission through an antenna 214 to the base station.

Following the transmission of each data frame, a response may be transmitted from the base station to the subscriber station over the forward link indicating whether the data frame was successfully decoded. The response may be an ACK indicating that the data frame was successfully decoded. Conversely, the response may be a NACK indicating that the data frame was corrupted and requesting a retransmission of that data frame. The response can be sent from the base station in a separate transmission or accompanying the forward link traffic. Where the response is transmitted with the forward link traffic, the response can be time-division multiplexed, frequency-division multiplexed, code-division multiplexed, or multiplexed using any other scheme known in the art. Alternatively, the response can be transmitted with the forward link pilot signal. This approach ensures timely delivery of the response to the subscriber station even when the forward link traffic is not present. Typically, the response will be covered with a unique Walsh function so that it can be combined with other forward link transmissions before being quadrature modulated with the short PN codes.

The forward link transmission is received by the antenna 214 and provided to a receiver 216. The receiver 216 filters, amplifies, and downconverts the forward link transmission to a baseband signal. The baseband signal can be coupled to a demodulator 218 where it is quadrature demodulated with the short PN codes and decovered by the Walsh codes to separate the various signals. The forward link traffic can then be despread using the long PN code and provided to a decoder 220 for de-interleaving and decoding. The ACK or NACK response can be coupled from the demodulator 218 to the frame synchronizer 204. The frame synchronizer 204 initiates the retransmission of the data frame in response to a NACK response by re-releasing the data frame from the data queue 203 after a predetermined retransmission delay. By way of example, if data frames 1, 2, 3, 4, 5, 6 and 7 are queued to be released sequentially from the data queue 203, and a NACK response is generated from data frames 1, 3 and 4, then the frame synchronizer 204 will insert frame repeats in the sequence such that data frames 1, 2, 3, 1, 4, 3, 5, 4, 6 and 7 are sequentially released from the data queue 203 if the retransmission delay is set for two data frames.

The transmission power for each data frame can be controlled by a gain signal computed by the gain control 210 based on the traffic-pilot ratio. The traffic-pilot ratio is typically predetermined during the call set up based on any number of parameters such as the carrier frequency, chip rate, data rate, modulation scheme, frame length, or any other parameters. The gain signal applied to the data frames can be computed by means well known in the art from the predetermined traffic-pilot ratio and the reverse link transmission power of the pilot signal. In existing CDMA communications systems, the reverse link transmission power of pilot signal is computed with two power control loops: an open loop control and a closed loop control. The open loop control is designed to control the reverse link transmission power of the pilot signal as a function of path loss, the effect of base station loading, and environmentally induced phenomena such as fast fading and shadowing. The closed loop control is designed to correct the open loop estimate to achieve a desired signal-to-noise ratio. This can be achieved by measuring the reverse link power of the pilot signal at the base station and providing feedback to the subscriber station to adjust the reverse link transmission power for the pilot signal.

The gain applied to the data frames during retransmission can be reduced by reducing the traffic-pilot ratio. To optimize performance, the traffic-pilot ratio should be reduced to the point where the transmission power is limited to that necessary to successfully decode the retransmitted frame at the base station using the soft decisions of the same frame previous transmitted. An adaptive algorithm can be used to maintain an optimal traffic-pilot ratio for retransmission frames despite changing data rates and environmental conditions. The adaptive algorithm can be implemented to adjust the traffic-pilot ratio during retransmission frames based on whether or not the previous retransmission frame was successfully decoded by the base station. The previous retransmission frame can be either the same frame, or alternatively, a retransmission of an entirely different data frame. To illustrate this concept using the earlier example, if data frames 1, 2, 3, 4, 5, 6 and 7 are queued to be released sequentially from the data queue 203, and a NACK response is generated from data frames 1, 3 and 4, then the frame synchronizer 204 will insert frame repeats in the sequence such that data frames 1, 2, 3, 1, 4, 3, 5, 4, 6 and 7 are sequentially released from the data queue 202. In this case, the traffic-pilot ratio used to compute the gain signal for the retransmission of frame 3 will be based on the feedback from the base station for the retransmission of frame 1.

A flag 204a set by the frame synchronizer 204 can be used by the gain control 210 to identify the retransmission frames. If the frame synchronizer 204 releases a data frame from the data queue 203 for initial transmission, the flag 204a is cleared, and the gain control 210 uses the predetermined traffic-pilot ratio to compute the gain signal. Conversely, if the frame synchronizer 204 releases a data frame from the data queue 203 for retransmission, the flag 204a is set, and the gain control 210 adjusts the traffic-pilot ratio to some level below the predetermined level, computes the gain signal applied to the data frame in the modulator 218 based on the adjusted traffic-pilot ratio, and listens for feedback from the base station for the retransmitted data frame. The feedback 218a can be provided to the gain control 210 from the demodulator 208. When the next retransmission frame is released from the data queue 203, the feedback for the previous retransmission frame can be used to adjust the traffic-pilot ratio to compute a new gain signal.

Figure 3:
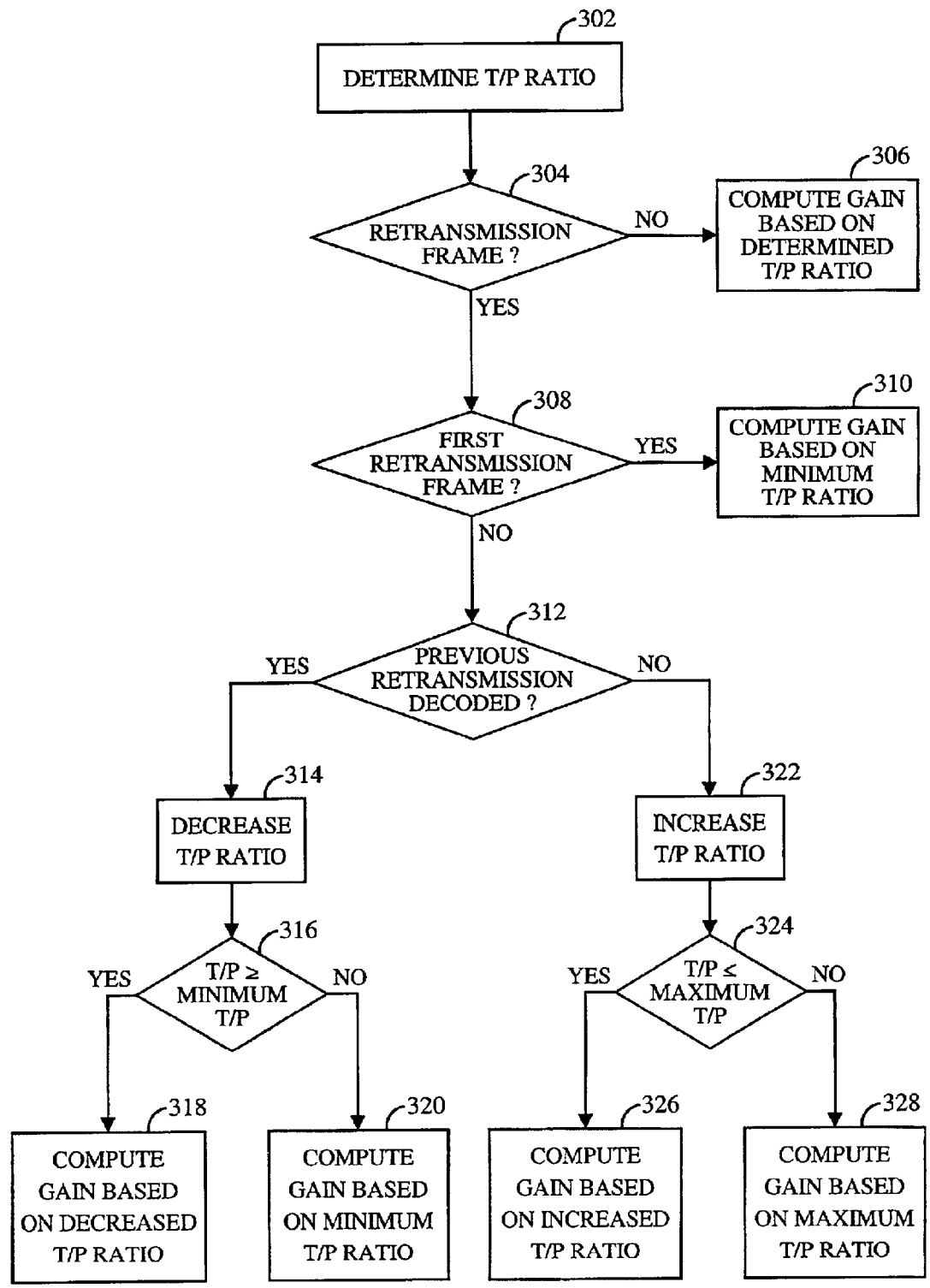
FIG. 3 is a flow diagram illustrating an exemplary algorithm for a gain control function in a subscriber station.

Various algorithms can be implemented by the gain control depending on the particular application and overall design requirements. FIG. 3 is a flow diagram illustrating an exemplary algorithm. In step 302, a predetermined traffic-pilot ratio is established based on various parameters such as the carrier frequency, chip rate, data rate, modulation scheme, frame length, or any other parameters. This is typically done during call set up. In step 304, the flag from the frame synchronizer is checked to determine whether the data frame released from the data queue is a retransmission frame. If the data frame is not a retransmission frame, the traffic-pilot ratio is set to the predetermined value to compute the gain signal in step 306. Conversely, if the data frame released from the data queue is a retransmission frame, then a determination is made as to whether the data frame is the first retransmission frame of the call in step 308. If the data frame is the first retransmission of the call, then the traffic-pilot ratio is set to a minimum value to compute the gain signal in step 310.

Assuming that the data frame is not the first retransmission of the call, then a determination is made as to whether the previous retransmission frame was successfully decoded by the base station in step 312. If the previous retransmission frame was successfully decoded, then the traffic-pilot ratio for the current retransmission frame is reduced in step 314. The magnitude of the traffic-pilot ratio reduction is application dependent and those skilled in the art will be readily able to determine the appropriate magnitude based on the overall design parameters. The reduced traffic-pilot ratio is then compared with the minimum value in step 316. If the reduced traffic-pilot is greater than or equal to the minimum value, then the reduced traffic-pilot ratio is used to compute the gain signal in step 318. Conversely, if the reduced traffic-pilot ratio is below the minimum value, then the traffic-pilot ratio is set to the minimum value and the gain signal is computed at the minimum value in step 320.

Assuming that the previous retransmission frame was not successfully decoded at the base station, then the traffic-pilot ratio for the current retransmission frame is increased in step 322. The magnitude of the traffic-pilot ratio increase is application dependent and those skilled in the art will be readily able to determine the appropriate magnitude based on the overall design parameters. The increased traffic-pilot ratio is then compared with a maximum value in step 324. If the increased traffic-pilot is less than or equal to the maximum value, then the increased traffic-pilot ratio is used to compute the gain signal in step 326. Conversely, if the increased traffic-pilot ratio is above the maximum value, then the traffic-pilot ratio is set to the maximum value and the gain signal is computed at the maximum value in step 328.

An exemplary application of the algorithm can be illustrated using the earlier example with data frames 1, 2, 3, 4, 5, 6 and 7 queued to be released sequentially from the data queue, and a NACK response generated from data frames 1, 3 and 4, resulting in data frames 1, 2, 3, 1, 4, 3, 5, 4, 6 and 7 being sequentially released from the data queue. For the purposes of explanation, the predetermined traffic-pilot ratio is equal to the maximum traffic-pilot ratio which is equal to 5 dB. The magnitude of any increase in the traffic-pilot ratio will be equal to ½ of the magnitude in dB between the traffic-pilot ratio for the previous retransmission frame and the maximum traffic-pilot ratio. In addition, the minimum traffic-pilot ratio is equal to 1 dB, and the magnitude of any reduction in the traffic-pilot ratio is equal to ½ the magnitude in dB between the traffic-pilot ratio for the previous retransmission frame and the minimum traffic-pilot ratio.

Figure 4:
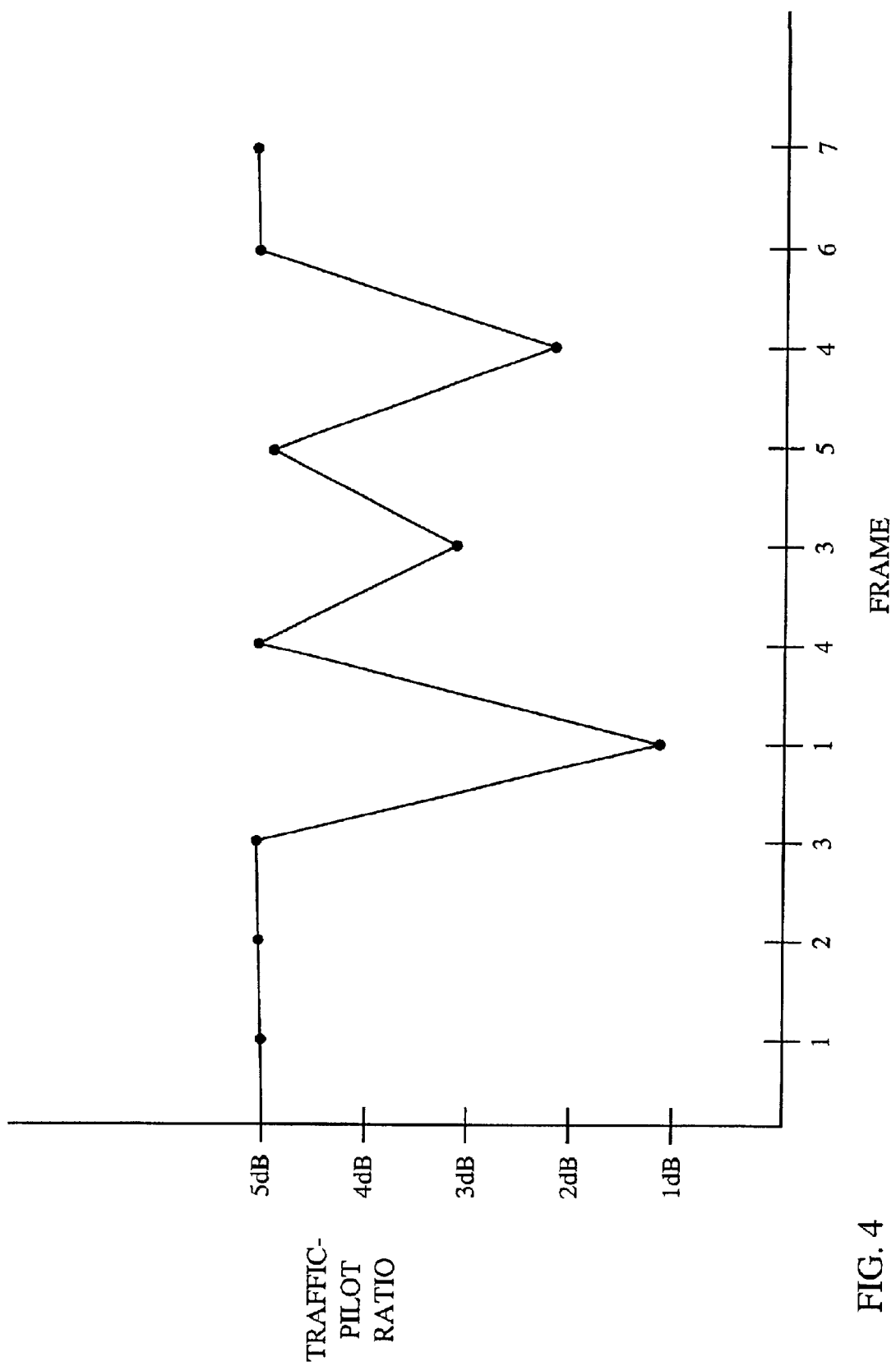
FIG. 4 is a graphical illustration of an exemplary adaptive traffic-pilot ratio used to implement the gain control function.

A graphical illustration of the adaptive traffic-pilot ratio under these conditions is shown in FIG. 4. The initial transmission of data frames 1, 2, and 3 would be transmitted with a traffic-pilot ratio of 5 dB. The retransmission of data frame 1, being the first retransmission for the call, would be transmitted at the minimum traffic-pilot ratio, i.e., 1 dB. The initial transmission of frame 4 following the retransmission of frame 1 would be at the predetermined traffic-pilot ratio, i.e., 5 dB. The traffic-pilot ratio used for the retransmission of frame 3 would depend on whether the retransmission of frame 1 was successfully decoded at the base station. If the retransmission of frame 1 was not successfully decoded, then the traffic-pilot ratio for the retransmission of frame 3 would be adjusted to 3 dB as shown in FIG. 4, i.e., half the magnitude between the traffic-pilot ratio for the retransmission of frame 1 and the maximum value. Conversely, if the retransmission of frame 1 was successfully decoded at the base station, then the traffic-pilot ratio for the retransmission of frame 3 would be adjusted to 1 dB. Either way, the initial transmission of frame 5 following the retransmission of frame 3 would be at the predetermined traffic-pilot ratio, i.e., 5 dB.

The retransmission of frame 4 would depend on whether the retransmission of frame 3 was successfully decoded at the base station. Assuming that the retransmission of frame 3 occurred with a traffic-pilot ratio of 3 dB and was successfully decoded at the base station, then the traffic-pilot ratio for the retransmission of frame 4 would be adjusted to 2 dB as shown in FIG. 4, i.e., half the magnitude between the traffic-pilot ratio for the retransmission of frame 3 and the minimum value. Assuming that the retransmission of frame occurred with a traffic-pilot ratio of 3 dB and was not successfully decoded at the base station, then the traffic-pilot ratio for the retransmission of frame 4 would be adjusted to 4 dB, i.e., half the magnitude between the traffic-pilot ratio for the retransmission of frame 3 and the maximum value. Either way, the initial transmission of frames 6 and 7 following the retransmission of frame 4 would be at the predetermined traffic-pilot ratio, i.e., 5 dB.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of adaptively adjusting a traffic-to-pilot ratio of frames being retransmitted on a reverse link from a wireless device, comprising:

initially transmitting a frame at a predetermined traffic-to-pilot ratio;

retransmitting the frame a first time with a gain based on the predetermined traffic-to-pilot ratio;

adjusting the traffic-to-pilot ratio based on whether the retransmitted frame was decoded successfully; and retransmitting the frame a second time with a gain based on a lowest allowable traffic-to-pilot ratio if the adjusted traffic-to-pilot ratio decreases below the lowest allowable traffic-to-pilot ratio.

2. A method of claim 1, adjusting the traffic-to-pilot ratio based on whether the retransmitted frame was decoded successfully, comprises:

decreasing the traffic-to-pilot ratio by an adjustment factor if the retransmitted frame was decoded successfully.

3. A method of claim 1, wherein, adjusting the traffic-to-pilot ratio based on whether the retransmitted frame was decoded successfully, comprises:

increasing the traffic-to-pilot ratio by an adjustment factor if the first retransmitted frame was undecodable.

4. A method of claim 3, further comprising:

combining information from the undecodable frame and information from the second retransmitted frame to generate a decodable frame; and decoding the decodable frame.

5. A method of adaptively adjusting a traffic-to-pilot ratio of frames being retransmitted on a reverse link from a wireless device, comprising:

initially transmitting a frame at a predetermined traffic-to-pilot ratio;

retransmitting the frame a first time with a gain based on the predetermined traffic-to-pilot ratio;

adjusting the traffic-to-pilot ratio based on whether the retransmitted frame was decoded successfully; and wherein if the adjusted traffic-to-pilot ratio increases above a highest allowable traffic-to-pilot ratio, retransmitting the frame a second time with a gain based on the highest allowable traffic-to-pilot ratio.

6. A method of claim 1, wherein the frame is transmitted on the reverse link from a wireless device.

7. A method of claim 2, wherein the adjustment factor depends on a data rate at which the frame is transmitted.

8. A method of claim 2, wherein the adjustment factor depends on channel conditions.

9. A method of claim 1, wherein the predetermined traffic-to-pilot ratio depends on a frame size of the frame being transmitted.

10. A method of claim 1, wherein the predetermined traffic-to-pilot ratio depends on a data rate at which the frame is being transmitted.

11. A cellular communication system, comprising:
a base station; and
a wireless device, comprising:
a transmitter configured to initially transmit a frame on a reverse link to the base station with a gain based on a predetermined traffic-to-pilot ratio, wherein the transmitter retransmits the frame a first time to the base station upon receiving an indication over a forward link from the base station that the frame was not decoded successfully by the base station;
a controller configured to adjust the traffic-to-pilot ratio based on whether the base station decodes the retransmitted frame successfully,
wherein the transmitter retransmits the frame a second time to the base station with a gain based on a lowest allowable traffic-to-pilot ratio if the adjusted traffic-to-pilot ratio decreases below the lowest allowable traffic-to-pilot ratio.

12. A cellular communication system of claim 11, wherein the controller is configured to decrease the traffic-to-pilot ratio by an adjustment factor if the retransmitted frame was decoded successfully.

13. A cellular communication system of claim 11, wherein the controller increases the traffic-to-pilot ratio by an adjustment factor if the first retransmitted frame was undecodable.

14. A cellular communication system, comprising:
a base station; and
a wireless device, comprising:
a transmitter configured to initially transmit a frame on a reverse link to the base station with a gain based on a predetermined traffic-to-pilot ratio, wherein the transmitter retransmits the frame a first time to the base station upon receiving an indication over a forward link from the base station that the frame was not decoded successfully by the base station;
a controller configured to adjust the traffic-to-pilot ratio based on whether the base station decodes the retransmitted frame successfully, and wherein if the adjusted traffic-to-pilot ratio increases above a highest allowable traffic-to-pilot ratio, the controller instructs the transmitter to retransmit the frame a second time with a gain based on the highest allowable traffic-to-pilot ratio.

15. A cellular communication system of claim 12, wherein the adjustment factor depends on a data rate at which the frame is transmitted.

16. A cellular communication system of claim 12, wherein the adjustment factor depends on channel conditions.

17. A cellular communication system of claim 11, wherein the predetermined traffic-to-pilot ratio depends on a frame size of the frame being transmitted.

18. A cellular communication system of claim 11, wherein the predetermined traffic-to-pilot ratio depends on a data rate at which the frame is being transmitted.

19. A cellular communication system of claim 11, wherein the base station comprises:
a soft combiner that soft combines information from the undecodable frame and information from the second retransmitted frame to generate a decodable frame.

20. A cellular communication system of claim 19, wherein the base station further comprises:
a decoder configured to decode the decodable frame that includes the soft combined information from the undecodable frame and the retransmitted frame.

21. A wireless device that adaptively adjusts a traffic-to-pilot ratio of frames being retransmitted on a reverse link from the wireless device comprising:
a transmitter configured to initially transmit a frame on the reverse link with a gain based on a predetermined traffic-to-pilot ratio, wherein the transmitter retransmits the frame a first time upon receiving an indication that the frame was not decoded successfully;
a controller configured to adjust the traffic-to-pilot ratio based on whether the retransmitted frame was decoded successfully,
wherein the transmitter retransmits the frame a second time with a gain based on a lowest allowable traffic-to-pilot ratio if the adjusted traffic-to-pilot ratio decreases below the lowest allowable traffic-to-pilot ratio.

22. A wireless device of claim 21, wherein the controller is configured to decrease the traffic-to-pilot ratio by an adjustment factor if the retransmitted frame was decoded successfully.

23. A wireless device of claim 21, wherein the controller increases the traffic-to-pilot ratio by an adjustment factor if the retransmitted frame was undecodable.

24. A wireless device that adaptively adjusts a traffic-to-pilot ratio of frames being retransmitted on a reverse link from the wireless device, comprising:
a transmitter configured to initially transmit a frame on the reverse link with a gain based on a predetermined traffic-to-pilot ratio, wherein the transmitter retransmits the frame a first time upon receiving an indication that the frame was not decoded successfully;
a controller configured to adjust the traffic-to-pilot ratio based on whether the retransmitted frame was decoded successfully, and
wherein if the adjusted traffic-to-pilot ratio increases above a highest allowable traffic-to-pilot ratio, the controller instructs the transmitter to retransmit the frame a second time with a gain based on the highest allowable traffic-to-pilot ratio.

25. A wireless device of claim 22, wherein the adjustment factor depends on a data rate at which the frame is transmitted.

26. A wireless device of claim 22, wherein the adjustment factor depends on channel conditions.

27. A wireless device of claim 21, wherein the predetermined traffic-to-pilot ratio depends on a frame size of the frame being transmitted.

28. A wireless device of claim 21, wherein the predetermined traffic-to-pilot ratio depends on a data rate at which the frame is being transmitted.

* * * * *